Patented Dec. 12, 1950

2,533,210

UNITED STATES PATENT OFFICE 2,533,210

METHOD FOR SULFONATION OF POLYSTYRENE

Massimo Baer, Springfield, Mass., assignor to Monsanto Chemical Company, St. Louis, Mo., a corporation of Delaware No Drawing. Application August 11, 1949, Serial No. 109,811

3 Claims. (Cl. 260—93.5)

This invention relates to a process for preparing sulfonated polystyrene. More particularly, the invention relates to a process for preparing water-soluble sulfonated polystyrene.

Prior methods for sulfonating polystyrene, using either sulfuric acid, sulfur trioxide or chlorosulfonic acid as the sulfonating agent, have been quite successful in preparing sulfonated polystyrenes which were insoluble in water and were useful as ion exchange resins. However, using these reagents, it was found almost impossible to obtain water-soluble polystyrenes which could be freed from the sulfonating agents. For example, the excess sulfuric acid used in the sulfonation of polystyrene cannot be removed from the product by any of the conventional methods for separating sulfonic acids from sulfuric acids.

It is an object of this invention to provide a process for preparing water-soluble sulfonated polymers of styrene.

This and other objects are attained by sulfonating a solid polymerized styrene in a chlorinated solvent using a complex of sulfur trioxide and bis-(beta-chlorethyl) ether as a sulfonating agent.

The following examples are given in illustration of this invention and are not intended as limitations on the scope thereof. Where parts are mentioned, they are parts by weight.

Example I

A coordination complex of bis-(beta-chlorethyl) ether and sulfur trioxide was prepared by dissolving 430 parts (3 mols) of bis-(beta-chlorethyl) ether in approximately 2000 parts of ethylene dichloride, cooling the solution to about −2° C. and adding to the cooled solution 120 parts (1.5 mols) of liquid sulfur trioxide with constant stirring and at such a rate that the temperature of the reaction mixture remained at about −2° C. throughout the reaction. Inasmuch as the reaction was quite exothermic, it was necessary to cool the reaction vessel throughout the reaction. The product of this reaction was a solution in ethylene dichloride of a coordination complex of bis-(beta-chlorethyl) ether and sulfur trioxide in a molar ratio of approximately 2:1. The solution thus made was cooled to about −20° C. and 104 parts of solid polystyrene, having a molecular weight of about 65,000 (1 mol, based on the styrene monomer unit), dissolved in ethylene dichloride (about a 10% solution), was added rapidly to the solution containing a sulfur trioxide complex with constant stirring. During the addition, the temperature of the reaction medium rose to about 2° C. and finely divided sulfonated polymer came out of solution and remained suspended in the solvent in the form of a slurry. The temperature of the slurry was then raised to about 15° C. over a period of about 30 minutes and the sulfonated polymer was recovered from the ethylene dichloride by filtration. The recovered sulfonated polymer was dissolved in water and retained solvent was removed by steam distillation. The product was a clear, viscous solution, free from gelatinous material. The solution was made neutral with sodium hydroxide and the water was removed by evaporation. The product was a clear, slightly yellow, hard solid which, upon analysis, was found to contain an average of 1.2 sodium sulfonate groups per styrene unit.

Example II

The process of Example I was repeated except that the amount of chlorethyl ether was reduced to 285 parts (2 mols) and the sulfur trioxide was reduced to 80 parts (1 mol). The product contained 0.85 sodium sulfonate group per styrene unit.

Example III

Example I was repeated except that the amount of chlorethyl ether was increased to 715 parts (5 mols) and the sulfur trioxide was increased to 20 parts (2.5 mols). The product contained approximately 1.7 sodium sulfonate groups per styrene unit.

The products of each of the examples were completely soluble in water whether they were tested in the form of a free acid or of the sodium salt thereof.

Any solid polymerized styrene may be used in the process of this invention to provide a soluble sulfonated polymer, provided that the polystyrene is soluble in chlorinated solvents such as ethylene dichloride, carbon tetrachloride, tetrachlorethane, chloroform, etc. As a general rule, polymerized styrene having a molecular weight of from about 5000 to about 500,000, as determined by the Staudinger equation, may be employed in this process.

As shown above, the process must be carried out in a chlorinated, aliphatic, hydrocarbon solvent such as ethylene dichloride, chloroform, carbon tetrachloride, tetrachlorethane, etc. The amount of solvent used is not critical although there must be enough solvent present to provide for easy handling of the reaction. In other words, too viscous solutions might prevent the homogeneous dispersion of the reaction components throughout the reaction solution and might also make it difficult to prevent overheating during the reaction.

The bis-(beta-chlorethyl) ether-sulfur trioxide complex is best prepared, as shown in Example I, by adding sulfur trioxide to a solution of the ether in a chlorinated solvent at temperatures between −10° C. and +10° C. The ratio of sulfur trioxide to bis-(beta-chlorethyl) ether may be varied within the range of 1 mol of sulfur trioxide to from 1.5 to 3 mols of the ether. If less than 1.5 mols of bis-(beta-chlorethyl) ether are used in the sulfonation reaction, it is too violent even at temperatures as low as −20° C. and undesirable products are produced; if more than 3 mols of the ether are employed to make the coordination complex, sulfonation of polystyrene becomes extremely slow and incomplete.

The temperature of the sulfonation reaction must be carefully controlled within the range of from about −15° C. to about +5° C. The sulfonation may be started at temperatures below −15° C. but it is too slow to be practical. At temperatures above +5° C., degradation of the polymer takes place and undesirable products are formed.

The extent of the sulfonation may be controlled by varying the ratio of solid polystyrene to sulfonating agent. In the examples, 104 parts (1 mol) of polystyrene was used for from 80 to 200 parts (1 to 2.5 mols) of sulfur trioxide. On a basis of 104 parts (1 mol, based on the monomeric styrene unit) of polystyrene, from 40 to 320 parts (0.5 to 4 mols) of sulfur trioxide may be used to obtain products having an average of from 0.5 to 2 sulfonic acid groups per styrene unit.

The sequence of the reaction steps shown in Example I may be varied to the extent that the polystyrene solution and the sulfur trioxide complex may be added concurrently to the reaction vessel. However, if the sulfur trioxide complex is added to the polystyrene solution, it is almost impossible to prevent the preparation of insoluble sulfonated polystyrenes.

The viscosity of the aqueous solutions of the sulfonated polystyrene may vary over an extremely wide range. For example, a 20% solution of a sulfonated polystyrene made from polystyrene having a molecular weight of about 11,000 had a viscosity of 17 centipoises. On the other hand, a 2% solution of a sulfonated polystyrene made from a polystyrene having a molecular weight of about 400,000 had a viscosity of 240 poises.

The viscosity of the sulfonated polystyrene may be further controlled by varying the slurrying time and conditions after all of the polystyrene has been added. Thus, in the examples, the sulfonated polystyrene was agitated as a slurry in ethylene dichloride for about 30 minutes as the temperature was being raised to 15° C. To increase the viscosity of the polystyrene, the agitation may be continued for a short time while maintaining the temperature of from 15° C. to 60° C. If the slurrying is continued for too long a period, an insoluble sulfonated polystyrene is formed.

For example, the sulfonated polystyrene made according to Example I had a viscosity, in a 10% aqueous solution, of 250 centipoises. A portion of the product of Example I will then heated with agitation at 35° C. for 15 minutes to attain a viscosity of 550 centipoises. This portion was then heated further at 55° C. for 10 minutes. The viscosity of the resultant material, in a 10% solution, was 1000 centipoises. A second portion of the product of Example I was heated in an ethylene dichloride slurry with agitation at 55° C. for 25 minutes to yield a product having a viscosity of 15,000 centipoises.

The process of this invention provides a means for preparing water-soluble sulfonated polystyrenes from a wide range of solid polymers of styrene, said sulfonated polymers having a wide range of viscosities. The process is also advantageous in that the sulfonated polymer is insoluble in the solvent in which it is prepared and therefore an easy means for separating the product from excess sulfonating agent is attained.

The products of this invention may be used as the free acid or the alkali metal salts thereof, including the lithium, sodium, potassium, rubidium, and cesium salts. The products are useful as sizing agents, protective colloids, adhesives, dispersing agents, thickening agents and tanning agents.

It is obvious that many variations may be made in the products and processes of this invention without departing from the spirit and scope thereof, as defined in the appended claims.

What is claimed is:

1. A process which comprises sulfonating solid polymers of styrene by reacting said polymers at temperatures from −15° C. to +5° C. in a chlorinated, aliphatic, organic solvent with a complex of sulfur trioxide and bis-(beta-chlorethyl) ether containing from 1.5 to 3 mols of bis-(beta-chlorethyl) ether per mol of sulfur trioxide.

2. A process as in claim 1 wherein the molar ratio of bis-(beta-chlorethyl) ether to sulfur trioxide is 2:1.

3. A process which comprises sulfonating solid polymers of styrene by reacting said polymers at temperatures from −15° C. to +5° C. in a chlorinated, aliphatic, organic solvent with a complex of sulfur trioxide and bis-(beta-chlorethyl) ether containing from 1.5 to 3 mols of bis-(beta-chlorethyl) ether per mol of sulfur trioxide and then increasing the viscosity of the product by heating it at from 15 to 60° C. with constant agitation.

MASSIMO BAER.

REFERENCES CITED

The following references are of record in the file of this patent:

Suter et al., J. Am. Chem. Soc., 60, 536–7 (1938).